(12) United States Patent
Maron et al.

(10) Patent No.: US 10,569,755 B2
(45) Date of Patent: Feb. 25, 2020

(54) DETECTION OF MOVEMENT OF A PARKED VEHICLE

(71) Applicant: Continental Teves AG & Co. oHG, Frankfurt (DE)

(72) Inventors: Christof Maron, Usingen (DE); Stefan Schubert, Friedrichsdorf (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 188 days.

(21) Appl. No.: 15/528,931

(22) PCT Filed: Dec. 8, 2015

(86) PCT No.: PCT/EP2015/078910
§ 371 (c)(1),
(2) Date: May 23, 2017

(87) PCT Pub. No.: WO2016/096522
PCT Pub. Date: Jun. 23, 2016

(65) Prior Publication Data
US 2017/0305403 A1 Oct. 26, 2017

(30) Foreign Application Priority Data
Dec. 15, 2014 (DE) .......... 10 2014 225 831

(51) Int. Cl.
*B60T 7/10* (2006.01)
*B60T 7/12* (2006.01)
(Continued)

(52) U.S. Cl.
CPC ............ *B60T 17/221* (2013.01); *B60T 7/108* (2013.01); *B60T 7/12* (2013.01); *B60T 7/122* (2013.01); *B60T 8/171* (2013.01); *B60T 8/245* (2013.01)

(58) Field of Classification Search
None
See application file for complete search history.

(56) References Cited

U.S. PATENT DOCUMENTS 5,667,282 A 9/1997 Kim
6,738,703 B2 5/2004 Ewinger et al.
(Continued)

FOREIGN PATENT DOCUMENTS

CN 101180479 A 5/2008
CN 102556020 A 7/2012
(Continued)

OTHER PUBLICATIONS

Notification of Reasons for Refusal for Japanese Application No. 2017-531734, dated May 21, 2018, with English translation, 7 pages.
(Continued)

*Primary Examiner* — Abdhesh K Jha
(74) *Attorney, Agent, or Firm* — RatnerPrestia

(57) ABSTRACT

A method for detecting a movement of a vehicle that has been shut down in a parked state, including: detecting a movement variable which describes a movement of the vehicle, integrating the movement variable, in a manner dependent on a movement direction of the vehicle, to obtain a movement travel, and, if the movement travel meets a predetermined condition, making a decision on the movement for detection.

11 Claims, 12 Drawing Sheets

(51) Int. Cl.
   *B60T 8/171* (2006.01)
   *B60T 8/24* (2006.01)
   *B60T 17/22* (2006.01)

(56) References Cited

U.S. PATENT DOCUMENTS

| | | | |
|---|---|---|---|
| 8,275,520 | B2 | 9/2012 | Sokoll et al. |
| 9,108,599 | B2 | 8/2015 | Blattert et al. |
| 9,216,719 | B2 | 12/2015 | Hasegawa et al. |
| 2004/0011610 | A1* | 1/2004 | Witzler .................. B60T 7/122 188/265 |
| 2008/0204214 | A1 | 8/2008 | Reith et al. |
| 2013/0056315 | A1 | 3/2013 | Bieltz et al. |
| 2014/0032074 | A1 | 1/2014 | Hasegawa et al. |
| 2014/0180535 | A1 | 6/2014 | Baehrle-Miller et al. |
| 2014/0222307 | A1 | 8/2014 | Richter et al. |

FOREIGN PATENT DOCUMENTS

| | | |
|---|---|---|
| DE | 19620491 A1 | 11/1997 |
| DE | 10021601 A1 | 11/2001 |
| DE | 10146949 A1 | 6/2002 |
| DE | 102005045998 A1 | 5/2006 |
| DE | 102005052160 A1 | 5/2007 |
| DE | 102005060023 A1 | 6/2007 |
| DE | 102011003183 A1 | 7/2012 |
| DE | 102011004704 A1 | 8/2012 |
| DE | 102011004786 A1 | 8/2012 |
| DE | 102011079362 A1 | 1/2013 |
| DE | 102012223178 A1 | 6/2014 |
| DE | 102014006069 A1 | 9/2014 |
| EP | 1445162 A1 | 8/2004 |
| GB | 2499696 A | 8/2013 |
| JP | 2003063365 A | 3/2003 |
| JP | 2003335147 A | 11/2003 |
| JP | 2012250691 A | 12/2012 |
| JP | 2014091353 A | 5/2014 |
| JP | 2014205391 A | 10/2014 |
| KR | 1019990012174 A | 2/1999 |
| KR | 1019990086833 A | 12/1999 |
| KR | 1020030050263 A | 6/2003 |
| WO | 0246016 A1 | 6/2002 |
| WO | 2012169245 A1 | 12/2012 |

OTHER PUBLICATIONS

Chinese Office Action for Chinese Application No. 201580068178.2. dated Nov. 1, 2018 with translation, 9 pages.
Korean Office Action for Korean Application No. 10-2017-7015918, dated Aug. 22, 2018 with translation, 10 pages.
Korean Notice of Allowance for Korean Application No. 10-2017-7015918, dated Feb. 19, 2019, with translation, 3 pages.
International Search Report and Written Opinion for International Application No. PCT/EP2015/078910, dated Mar. 16, 2016, 8 pages.
German Search Report for German Application No. 10 2014 225 831.6, dated Sep. 24, 2015, including partial English translation, 8 pages.
Indian Examination Report for Indian Application No. 201737017419, dated Jul. 23, 2019, with translation, 7 pages.

* cited by examiner

DETECTION OF MOVEMENT OF A PARKED VEHICLE

CROSS REFERENCE TO RELATED APPLICATIONS

This application is the U.S. National Phase Application of PCT International Application No. PCT/EP2015/078910 filed Dec. 8, 2015, which claims priority to German Patent Application No. 10 2014 225 831.6, filed Dec. 15, 2014, the contents of such applications being incorporated by reference herein.

FIELD OF THE INVENTION

The invention relates to a method for detecting a movement of a vehicle which has been shut down in a parked state, to a method for retensioning a parking brake and to a control device for carrying out at least one of the methods.

BACKGROUND OF THE INVENTION

DE 10 2011 079 362 A1, which is incorporated by reference discloses a method for retensioning a parking brake of a vehicle, which parking brake keeps the vehicle in a stationary state when the vehicle is shut down in a parked state.

SUMMARY OF THE INVENTION

An aspect of the present invention aims to improve the method for retensioning the parking brake.

According to one aspect of the invention, a method for detecting a movement of a vehicle which is shut down in a parked state, comprises the steps:
  acquiring a movement variable which describes a movement of the vehicle,
  integrating the movement variable as a function of a direction of movement of the vehicle with respect to a movement travel and
  deciding on the movement to be detected if the movement travel satisfies a predetermined condition.

The specified method is based on the consideration, that the retensioning of the parking brake which is specified at the beginning could be carried out on the basis of monitoring of rolling, in the scope of which a movement of the vehicle is detected when the vehicle is parked and therefore supposedly is assumed to be stationary. As a result, it would be possible to ensure directly that the application force of the parking brake is sufficiently high for the actual stationary state of the vehicle but not undesirably excessively high.

However, it is problematic that a movement of the vehicle does not necessarily have to result from rolling of the vehicle. Since movements of the vehicle are basically possible owing to a non-infinite high rigidity of the parking brake, movements of the vehicle can occur when a person enters the vehicle, exits the vehicle or when the vehicle is being loaded or unloaded and these movements can then be undesirably interpreted as a rolling movement. However, in this case movements are comparatively small shaking movements of the vehicle which, however, cannot be avoided even with increased retensioning of the parking brake.

If the parking brake is therefore to be retensioned on the basis of a rolling movement of the vehicle, the rolling movement should be clearly differentiated from the above-mentioned small shaking movements. This is where the specified method comes in with the consideration that the small shaking movements are ultimately oscillating movements. An oscillation travel which results from the oscillating movements is therefore canceled out owing to its change of direction of movement over a predetermined consideration time period. This is not the case with a rolling movement. Although a rolling movement can basically also be an oscillating movement with a very high oscillation amplitude, this oscillating movement is large compared to the comparatively small shaking movements explained above, with the result that the rolling movement travel is not canceled out over the predetermined consideration time period.

In the specified method, the predetermined condition for the movement travel can expediently be defined as a travel boundary which the movement travel should exceed within the previously explained consideration time period so that a rolling movement is decided on. The smaller the predetermined time period is selected to be here, the greater the extent to which the previously mentioned shaking movements are detected as a rolling movement.

However, the use of a movement boundary and of a predetermined consideration time period as a predetermined condition are not to be considered to be restrictive. Rather, said predetermined condition can be defined as desired. For example, the predetermined condition could also be defined in a frequency range of the movement travel, wherein the movement to be detected can be decided on if the movement travel has sufficiently small (movement) frequency components.

In order to determine the movement travel, a movement variable which describes the movement of the vehicle and which can be selected as desired is considered. In this way, the movement can be derived, for example from the acceleration of the vehicle or the speed of the vehicle. A further example which is preferred for implementation is described in the dependent claims.

In one development of the specified method, the vehicle comprises wheels, each having one wheel rotational speed sensor for outputting rotational speed pulses which are dependent on a rotational speed of the respective wheel, wherein the movement variable is described by the rotational speed pulses. As a result of the use of the wheel rotational speed sensors which are present on the vehicle in any case, the specified method can be implemented in a cost-effective fashion on the vehicle because no new sensors have to be attached to the vehicle in order to acquire the measurement variables which are necessary to carry out the specified method.

In an additional development of the specified method, a comparison of the rotational speed pulses from the wheel rotational speed sensor of a first wheel of the wheels of the vehicle and the rotational speed pulses from the wheel rotational speed sensor of a second wheel of the wheels of the vehicle is used to determine the direction of movement. On the basis of the comparison, the rotational speed pulses of the two wheel rotational speed sensors can be compared in order to infer a reversal of the direction of movement from, for example, the time profile of said rotational speed sensors. If the direction of movement is, for example, defined randomly at the beginning, it is therefore possible to infer the abovementioned oscillating movement over time. Whether the direction of movement which is initially defined randomly is correct or incorrect is irrelevant here because the specified method is ultimately intended to check only whether the movement to be detected is an oscillating movement or not and whether the resulting movement travel is canceled out or not.

In an additional development of the specified method, the comparison comprises comparing whether a rotational speed pulse from the wheel rotational speed sensor of the first wheel of the vehicle is directly followed chronologically by two rotational speed pulses from the wheel rotational speed sensor of the other wheel of the vehicle. The development is based on the consideration that the abovementioned change of direction of movement gives rise to generation of the rotational speed pulses which are symmetrical in terms of time axes, with respect to the time of the change of the direction of movement. Since owing to the principle involved (for example owing to cornering etc.) the rotational speed sensors never output the rotational speed pulses in synchronism with one another, a change of direction of movement of the vehicle causes two rotational speed pulses of the first wheel to be output chronologically between two rotational speed pulses of the second wheel, which can be used as a criterion of the detection of the change of the direction of movement.

With the developments described above, shaking movements of the vehicle can be differentiated cleanly from rolling movements of the vehicle at least in the longitudinal direction. However, if the vehicle is excited to shake, for example, when the door is closed in the transverse direction, the abovementioned rotational speed pulses occur completely randomly and are no longer predictable.

This is where a different development of the specified method having the following steps comes in:
  acquiring a comparison movement variable which describes a comparison movement of the vehicle,
  integrating the measured comparison movement variable as a function of a comparison movement direction with respect to a comparison movement travel, and
  deciding on the movement to be detected if both the movement travel and the comparison movement travel satisfy the predetermined condition.

The development is based on the consideration that in the case of an actual rolling movement the wheel rotational speed sensors of all the wheels generate the rotational speed pulses with the same pattern. The same applies if the movement variable is also acquired with different measuring pickups than with rotational speed sensors. The presence of this same pattern is checked with the comparison movement variable within the scope of the present development. Only if the movement which is to be detected is acquired on the basis of the movement variable and the comparison movement variable can a shaking movement of the vehicle actually be ruled out and a rolling movement can be inferred.

In one particular development of the specified method, the comparison movement variable is described by means of the rotational speed pulses, and the comparison movement direction is determined on the basis of a comparison of the rotational speed pulses from the wheel rotational speed sensors of at least two wheels of the vehicle, at least one wheel of which is a third wheel of the wheels of the vehicle. In this way it is possible to avoid a situation in which the movement to be detected is evaluated twice on the same movement variable of the vehicle, and a rolling movement of the vehicle is therefore inferred erroneously.

In yet another development of the specified method, a number of comparison movements based on the decision on the movement to be detected and/or the predetermined condition are dependent on a gradient of an underlying surface on which the vehicle is standing. Here, the decision should be configured all the more sensitively the steeper the underlying surface.

In a further development, the specified method comprises the step of resetting the movement travel and/or the comparison movement travel if the movement travel and/or the comparison movement travel satisfy/satisfies a further predetermined condition which is in particular different from the predetermined condition.

According to a further aspect of the invention, a method for retensioning a parking brake which keeps a vehicle which has been shut down in a parked state in a stationary state comprises the steps:
  detecting a movement of the vehicle which has been shut down in a parked state with a method as claimed in one of the preceding claims, and
  retensioning of the parking brake on the basis of the detected movement.

According to another aspect of the invention, a control device is configured to carry out one of the specified methods.

In one development of the specified control device, the specified device has a memory and a processor. In this context, the specified method is stored in the form of a computer program in the memory, and the processor is provided for carrying out the method when the computer program is loaded into the processor from the memory.

According to a further aspect of the invention, a computer program comprises program code means for carrying out all the steps of one of the specified methods when the computer program is executed on a computer or one of the specified devices.

According to a further aspect of the invention, a computer program product contains a program code which is stored on a computer-readable data carrier and which, when executed on a data processing device, carries out one of the specified methods.

According to a further aspect of the invention, a vehicle comprises one of the specified control devices.

BRIEF DESCRIPTION OF THE DRAWINGS

The properties, features and advantages of this invention described above as well as the way in which they are achieved, become clearer and more readily understandable in conjunction with the following description of the exemplary embodiments which are explained in more detail in conjunction with the drawings, in which.

DETAILED DESCRIPTION OF THE PREFERRED EMBODIMENTS

In the figures, the same technical elements are provided with the same reference symbols and are described only once.

Figure 1:
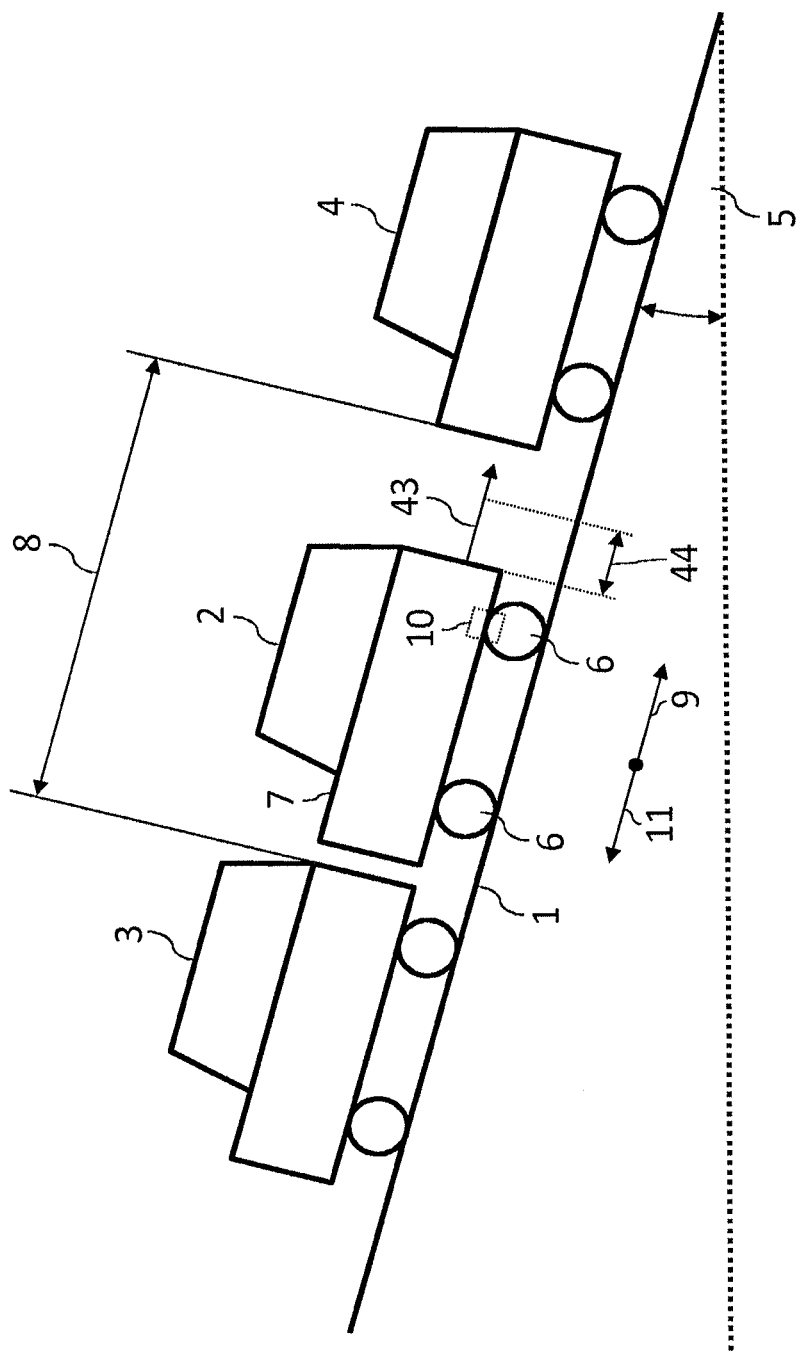
FIG. 1 shows a schematic view of a vehicle which is parked on the road.

Reference is made to FIG. 1 which shows a vehicle 2 which is parked on an underlying surface in the form of a road 1, between a second vehicle 3 and a third vehicle 4. The road 1 is inclined with a gradient 5.

The vehicle 2 comprises a chassis 7 which is supported in a moveable fashion on wheels 6, and is located in a parking space 8 between the second vehicle 3 and the third vehicle 4. So that the vehicle 2 does not roll down the road as a result of a downhill slope force 9 which is caused by the gradient 5, and collides, for example, with the third vehicle 4, it is kept in the stationary state in this parking space 8 by means of a parking brake 10 to be described below.

Figure 2:
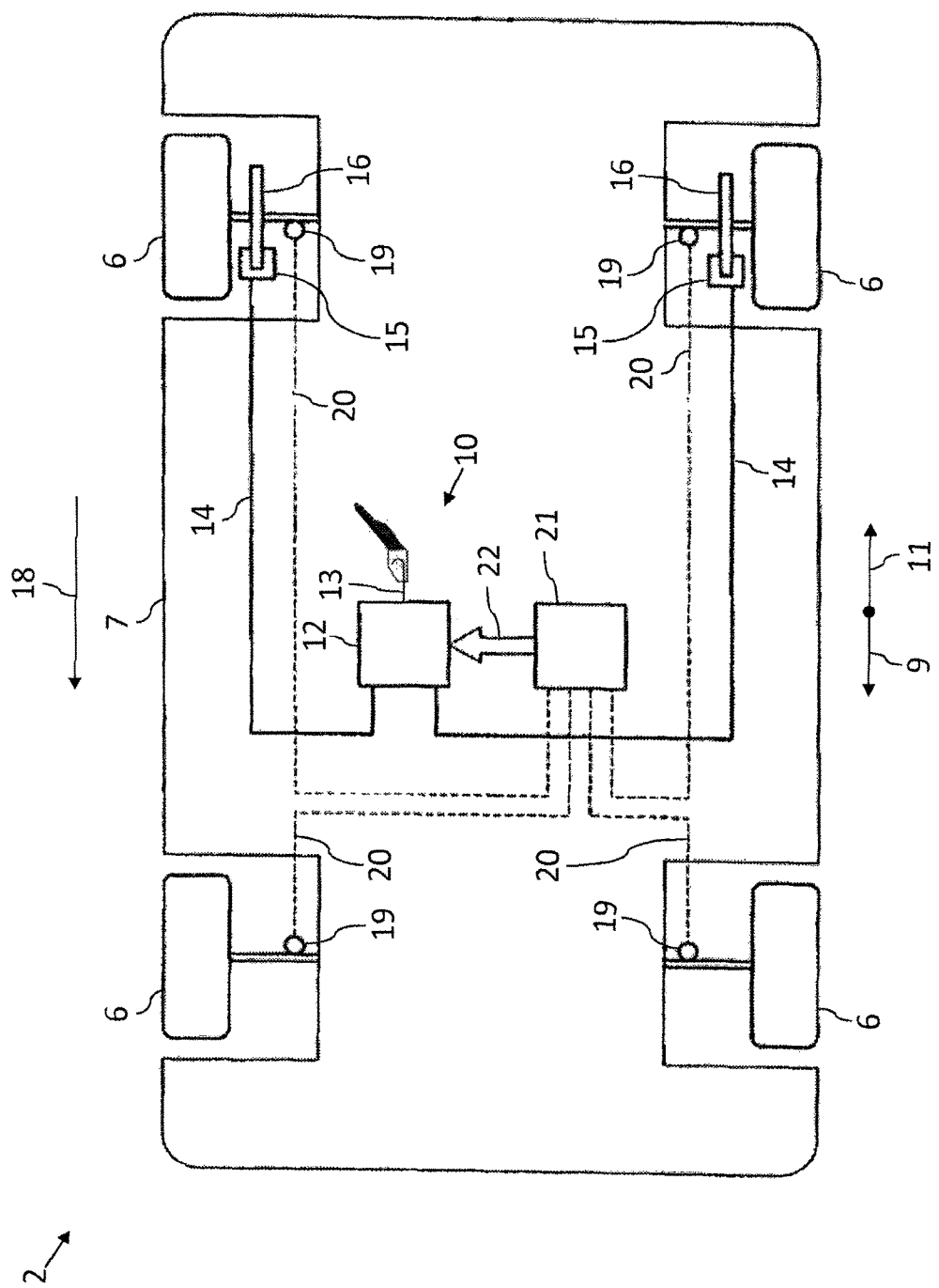
FIG. 2 shows a schematic view of the vehicle from FIG. 1.

In particular, the parking brake 10 holds the vehicle 2 with a holding force 11 which counteracts the downhill slope force 9. More details will be given on this below with reference to FIG. 2.

The parking brake 10 of the vehicle comprises a parking brake control device 12 which actuates, on the basis of a braking request 13, brake actuators 15, such as brake linings, which are mounted in a positionally fixed fashion with respect to the chassis 10, in order to apply said brake lining. As a result of the application, brake engagement elements 16 such as brake drums or brake disks which are arranged in a positionally fixed fashion with respect to the wheels 6 are clamped by the brake actuators 15 with, in each case, a clamping force (not illustrated further), with the result that rotation of the wheels 6 with respect to the chassis 7 is blocked and a movement of the vehicle 2 is prevented. This generates the holding force 11 which is intended to keep the vehicle 2 in the stationary state. In this context, the brake control signals 14 can be transmitted in any desired fashion, for example hydraulically, pneumatically or with bowden cables. In vehicles which are embodied as passenger vehicles, the brake control signals 14 are frequently transmitted electrically, for which reason the term electronic parking brake is also used.

The holding force 11 is primarily dependent here on the clamping forces with which the brake actuators 15 clamp the brake engagement elements 16. The magnitude of the clamping forces is in turn defined by the brake control signals 14. Therefore, if sufficiently large clamping forces are not predefined with the brake control signals 14, the holding force 11 may not be sufficient to cancel out the downhill slope force 9 and keep the vehicle 2 in a stationary state. On the other hand, the clamping forces should, however, also not be unnecessarily large so that the mechanical loads in the parking brake 10 remain as low as possible, for example for the sake of a long service life.

Figure 3:
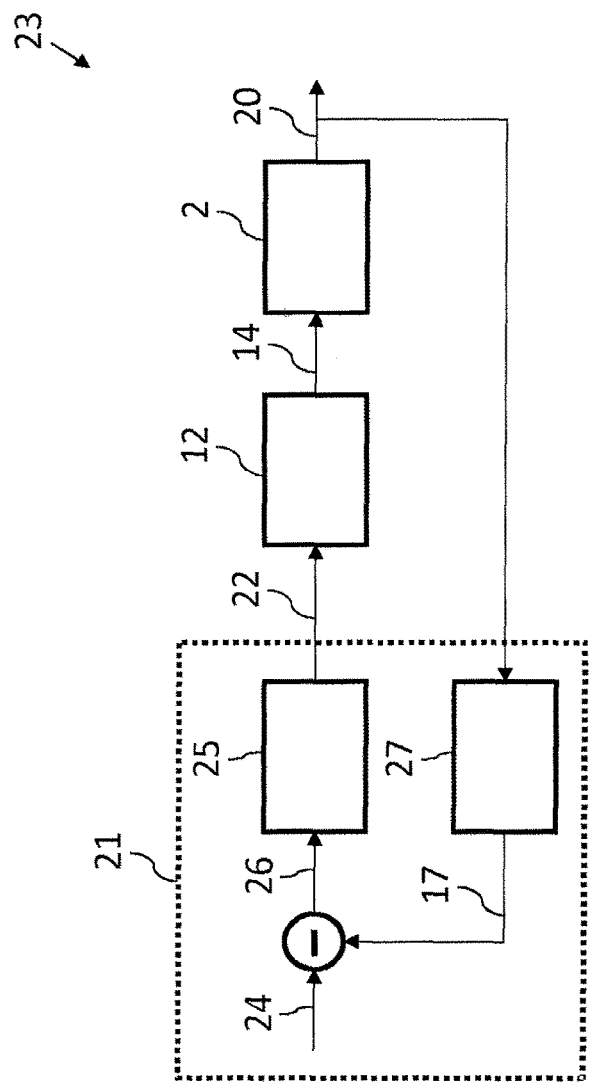
FIG. 3 shows a schematic view of a closed-loop control circuit for retensioning a brake in the vehicle in FIG. 2.

This is where the present embodiment comes in with the proposal to set the brake control signals 14 and therefore the holding force 11 as a function of a movement 17 of the vehicle 2 which is indicated in FIG. 3. The basis for the detection of the movement 17 of the vehicle 2 can basically be a measurement variable from any sensor in the vehicle 2, which measurement variable contains a movement speed 18 of the vehicle 2.

This movement variable which contains the movement speed 18 should expediently be acquired with sensors which are already present in the vehicle 2. For this purpose, for example rotational speed sensors 19 are appropriate which are usually present on each wheel 6 of the vehicle 2 in order to acquire a wheel rotational speed 20 of the respective wheel 6. These wheel rotational speeds 20 are used in the vehicle 2 for various applications such as, for example, the vehicle movement dynamics control or parking assistant. Inter alia, the so-called ground speed of the vehicle 2 can also be derived from the wheel rotational speeds 20, which ground speed could basically be used as a movement speed 18.

However, in order to detect a movement of the vehicle 2 as quickly as possible and therefore to keep the reaction times when setting the holding force 11 as short as possible, within the scope of the present embodiment is it proposed to detect the movement of the vehicle 2 directly from the wheel rotational speeds 19. For this purpose, the wheel rotational speeds 20 are fed to a movement prevention device 21. The movement prevention device 21 detects the movement 17 of the vehicle 2 with a movement detection device 27 in a manner to be described below.

In the case of the detected movement 17, the movement prevention device 21 outputs a brake request signal 22, on the basis of which the parking brake control device 12 can then set the brake control signals 14 appropriately, in order to set the holding force 11 to a sufficiently large value by means of the clamping forces specified above.

Viewed in abstract terms, the movement prevention device 21 constitutes part of a closed-loop control circuit 23 which is illustrated in FIG. 3 and in which the detected movement 17 is used as an actual variable and is compared with a setpoint variable 24 before the movement 17 of zero. In a controller 25 in the movement prevention device 21, a control difference 26 between the detected movement and the setpoint variable 24 is acquired, and the brake request signal 22 is set in such a way that the movement 17 is approximated to the setpoint variable 24 and therefore to a movement of zero.

Figure 4:
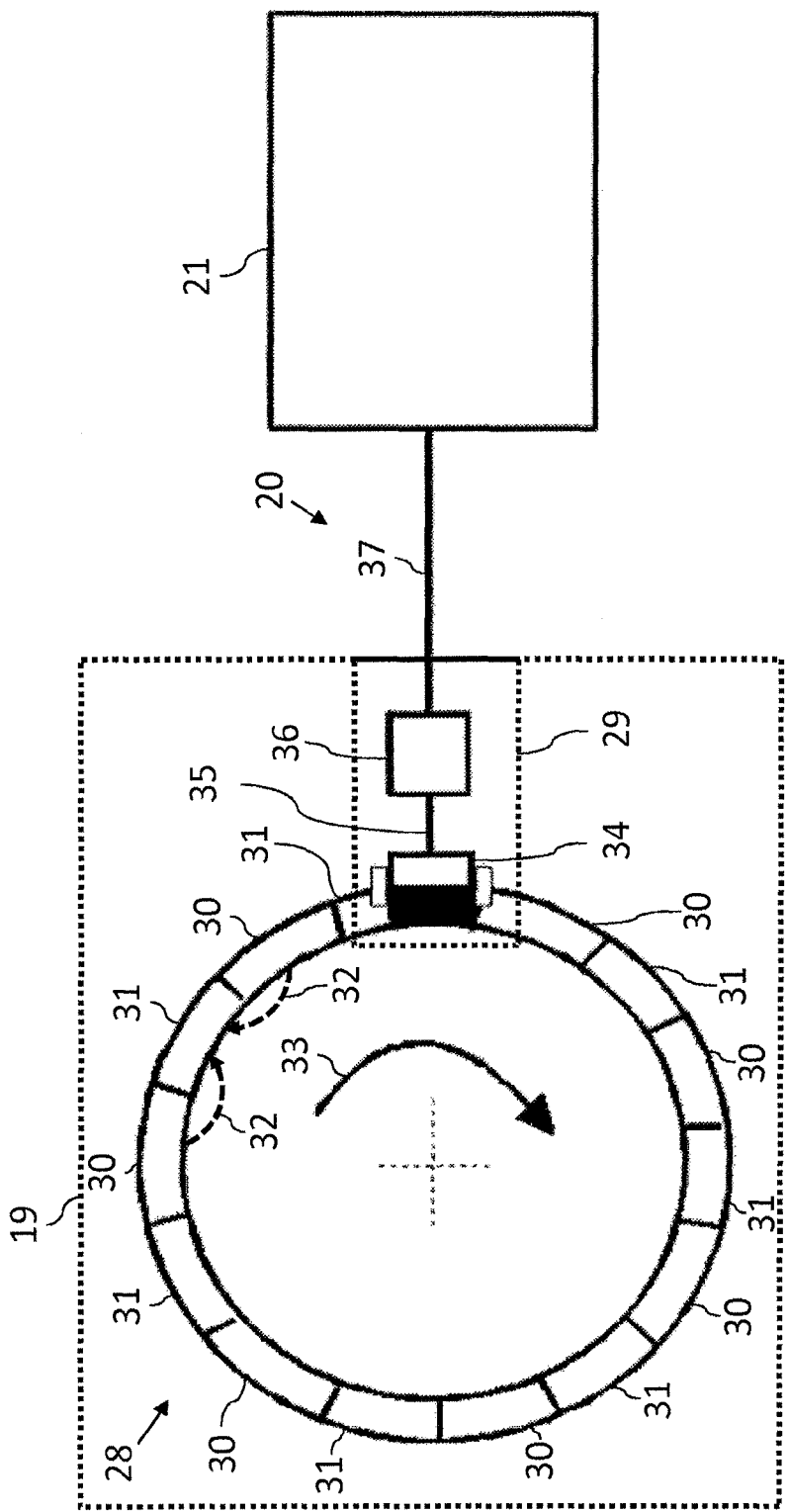
FIG. 4 shows a schematic view of a rotational speed sensor in the vehicle in FIG. 2.

Before more details are given on the detection of the movement, firstly more details will be given on the acquisition of the measurement variable which contains the movement speed 18 and therefore on the wheel rotational speeds 20. For this purpose, reference is made to FIG. 4 which shows a schematic view of the wheel rotational speed sensor 19.

Each rotational speed sensor 19 is embodied in the present embodiment as an active rotational speed sensor which comprises an encoder element, mounted in a rotationally fixed fashion on the wheel 6, in the form of an encoder disk 28 and a sensor circuit which is mounted in positionally fixed fashion with respect to the chassis 7 and is referred to below for the sake of simplicity as a reading head 29.

The encoder disk 28 is composed in the present embodiment of magnetic north poles 30 and magnetic south poles 31, which are arranged in rows next to one another and which together generate a physical field in the form of an encoder magnetic field 32. This encoder magnetic field 32 is indicated in FIG. 3 with two field lines (illustrated by dashed lines) for the sake of clarity. If the encoder disk 28 which is mounted on the wheel 6 rotates with the latter in a rotational direction 33, the encoder magnetic field 32 therefore rotates along with it.

The reading head 29 which is positionally fixed with respect to the chassis 7 comprises in the present embodiment a measuring sensor 34 which senses the encoder magnetic field 32 of the encoder disk 28 which rotates with the wheel 6 and converts it into an encoder signal 35. Owing to the principle involved, the encoder signal 35 is sinusoidal with a frequency which is directly dependent on the rotational speed 20. In a signal evaluation circuit 36, the sinusoidal encoder signal 35 is converted, for technical reasons, into a pulse signal 37 and output to the movement detection device 27 in the movement prevention device 21. The frequency of the pulse signal 37 therefore remains the same as the frequency of the encoder signal 35, and therefore the information about the rotational speed 20 is retained. Further background information on active wheel rotational speed sensors can be found in the relevant prior art, such as, for example, in DE 101 46 949 A1, which is incorporated by reference.

Figure 5:
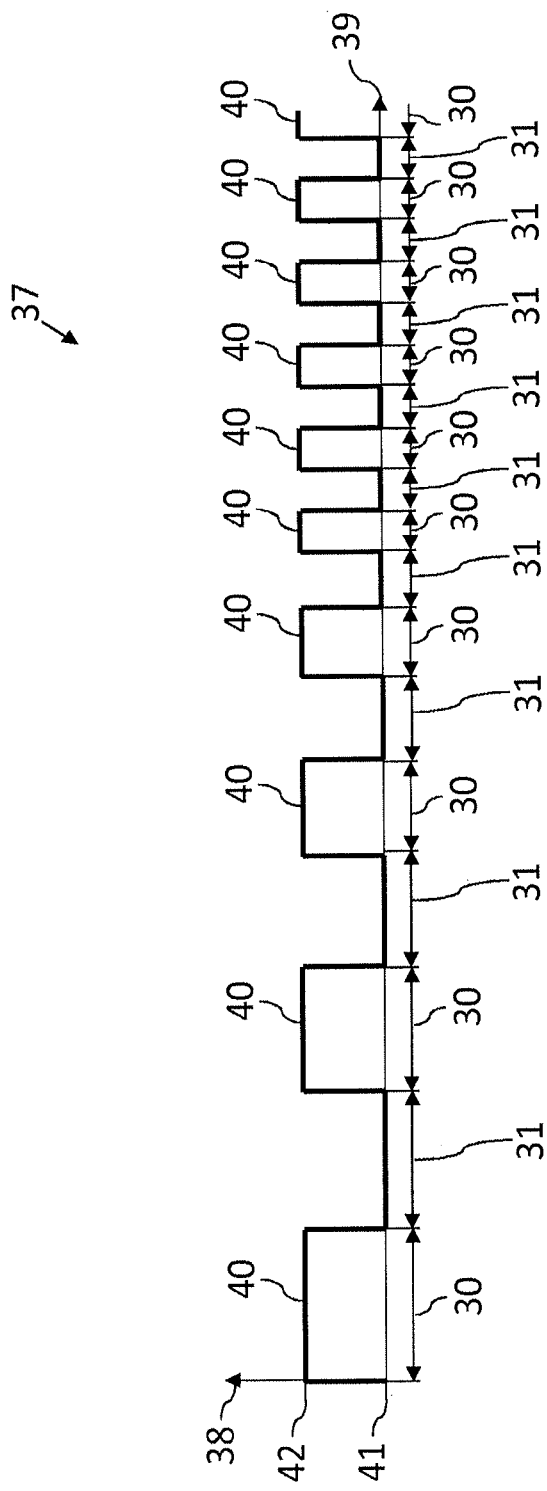
FIG. 5 shows an output signal from the rotational speed sensor in FIG. 4.
Figure 6:
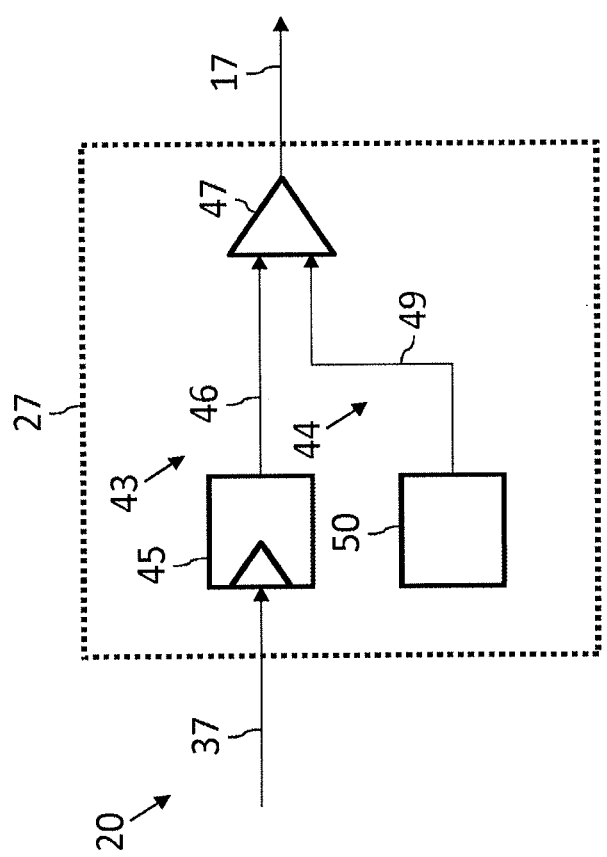
FIG. 6 shows a device for processing the output signal from FIG. 5.

More details are given below on a possible detection of the movement 17 in the movement detection device 27 on the basis of the wheel rotational speeds 20 with reference to FIGS. 5 and 6 which show the pulse signal 37 in a pulse level 38—time 39—diagram.

The pulse signal 37 indicates an accelerating movement 17 of the vehicle 2. This can be detected from the fact that the encoder disk 28 rotates more and more quickly. Correspondingly, pulses 40 in the pulse signal 37, which pulse to and fro between a first level value 41 and a second level value 42 become increasingly narrow over the time 39. In other words, the number of pulses 40 increase over the time 39 with the increasing movement speed 18 of the vehicle 2. The two level values 41, 42 are dependent on whether the encoder disk 28 is created with a magnetic north pole 30 or with a magnetic south pole 31 below the reading head 34.

A movement 17 of the vehicle 2 is understandably present when the vehicle 2 has detectedly traveled through a movement travel 43 indicated in FIG. 1. For this purpose, a predetermined condition can be defined for the movement travel 43, for example, in the form of a travel boundary 44 indicated in FIG. 1. If the movement travel 43 exceeds the travel boundary 44, the movement 17 of the vehicle 2 is decided on. The movement travel 44 results from integration of the movement speed 18 over the time 39, with the result that the previously explained concept can be implemented extremely easily if the movement speed 18 is present directly.

In the case of the present embodiment, the movement is to be detected in the movement detection device 27 from at least the wheel rotational speeds 20 from at least one of the wheel rotational speed sensors 19. In order to integrate the movement speed 18 and therefore to acquire the movement travel 43, the pulses 40 of the pulse signal 37 can be counted here in a counter 45. A travel counting value 46 which is obtained in this way is directly dependent on the movement travel 44 and can be compared in a comparison element 47 with a travel counting boundary 49 which is dependent on the travel counting boundary 48 and can be stored in a memory 50. If the travel counting value 46 exceeds the travel counting boundary 48, the movement 17 is decided on with the comparison element 47.

On the basis of the movement 17 which is detected in this way it is therefore possible for the closed-loop control circuit 23 to correspondingly engage in the vehicle 2 in the manner described above.

The movement 17 of the vehicle 2 which is to be detected is to be a rolling movement of the vehicle 2 here. In particular, the movement to be detected is not to include any shaking movements which arise when the vehicle 2 shakes to and fro as a result of an impact. Such shaking movements are not unusual because the brake actuators 15 on the vehicle 2 are arranged in a floating fashion with respect to the brake engagement elements 16 and therefore in the parked state the vehicle 2 is not held in an ideally roll-free fashion. As a rule, the encoder disk 28 has over ninety poles 30, 31, with the result that even the smallest rolling movements of a few degrees can generate pulse signals 37 with pulses 40 which are multiplied when the vehicle shakes to and fro and therefore can undesirably give rise to a detected movement 17 and therefore undesirably to relatively strong application of the brake actuators 15.

Figure 8:
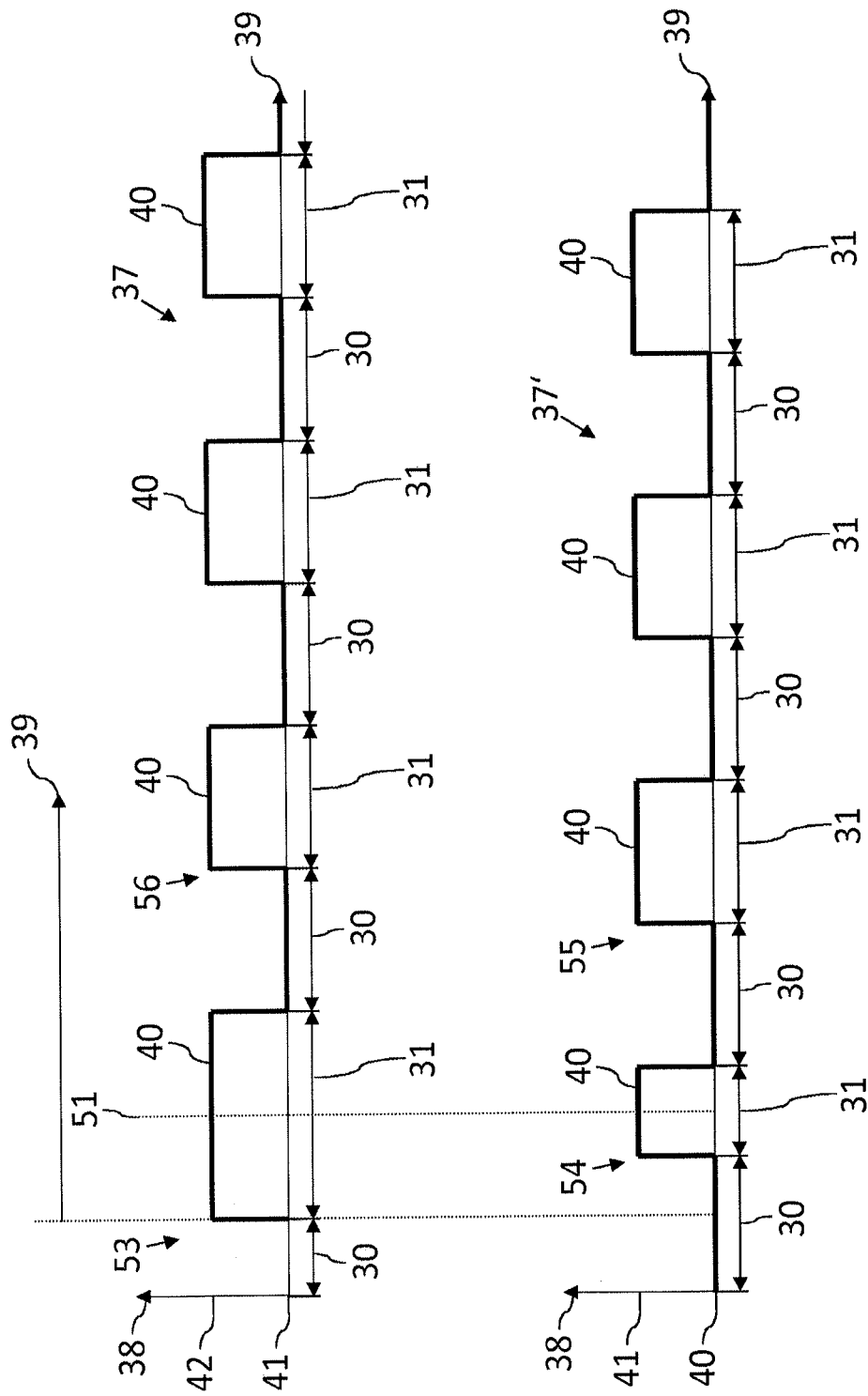
FIG. 8 shows the two output signals in FIG. 7 in a second movement situation of the vehicle in FIG. 2, and FIGS. 9 to 12 show alternatives for the device in FIG. 6 for processing the output signal in FIG. 5.

In order to gate out these shaking movements during the detection of the movement of the vehicle 2, in the present exemplary embodiment use is made of the realization that the shaking movement of the vehicle 2 is a diminishing movement with regular reversals 51 of the direction indicted in FIG. 8. These reversals 51 of direction are detected in the present exemplary embodiment and also taken into account in the integration of the movement travel 43 or of the travel counting value 46.

Figure 7:
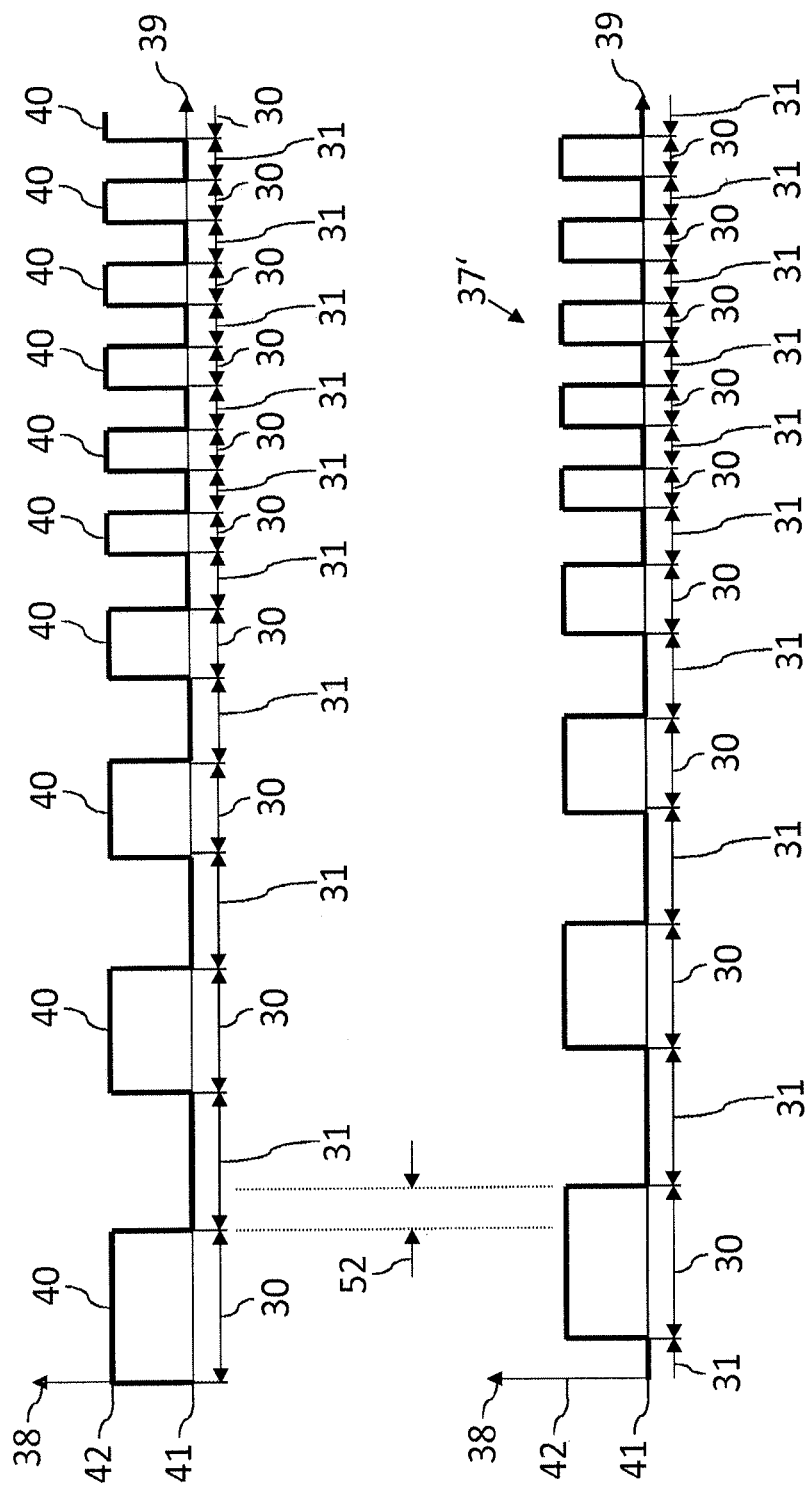
FIG. 7 shows two output signals from two different rotational speed sensors in the vehicle in FIG. 2 in a first movement situation of the vehicle in FIG. 2.

In order to detect the reversals 51 of direction in the present exemplary embodiment use is made of the realization that the pulse signals 37, 37' generally do not have a time profile which is synchronous with one another because the wheels do not rotate with the same rotational speed 20 from time to time, for example during cornering. In this way, phase offsets 52 indicated in FIG. 7 are introduced, said phase offsets 52 being indicated between the pulse signal 37 in FIG. 5 and a further pulse signal 37' from another wheel rotational speed sensor 19.

As indicated in FIG. 8, a reversal 51 of direction of the vehicle 2 has the effect, for example during the shaking movement which is to be gated out, that the individual pulse signals 37, 37' from the individual wheel rotational speed sensors 19 have a mirror-symmetrical profile at the time of the respective reversal 51 of direction, with the effect that a pulse 40 generated in the pulse signal 37 is followed, before the reversal 51 of direction, provided with reference symbol 53 in FIG. 8 for the sake of clarity, by a first pulse 40 and a second pulse 40 in the other pulse signal 37', which are correspondingly provided with the reference symbols 54 and 55 in FIG. 8 for the sake of clarity, before in the one pulse signal 37 with the pulse 53 it is followed by a further pulse 40 which is provided with the reference symbol 56 in FIG. 8 for the sake of clarity. This means that in the case of a reversal 51 of direction at a pulse 53 in one of the pulse signals 37 two pulses 54, 55 are detected in the other pulse signal 37' before a pulse is detected again in the pulse signal 37. Such a profile of the pulses 40 in the pulse signals 37, 37' cannot occur during a movement 17 in the form of a rolling movement of the vehicle 2 from the stationary state owing to the principle involved, with the result that this profile of the pulses 40 in the pulse signals 37, 37' can be used as a detection criterion for the reversal 51 of direction.

Therefore, within the scope of the present embodiment it is proposed to decide on the direction of reversal 51 on the basis of a comparison of two pulse signals 37, 37' if the scenario illustrated in FIG. 8 is detected. Then, for example instead of counting forward in the counter 54 in FIG. 6 it is possible to count backward in order to take into account the profile of the movement travel 43 during the shaking movement of the vehicle 2.

Figure 9:
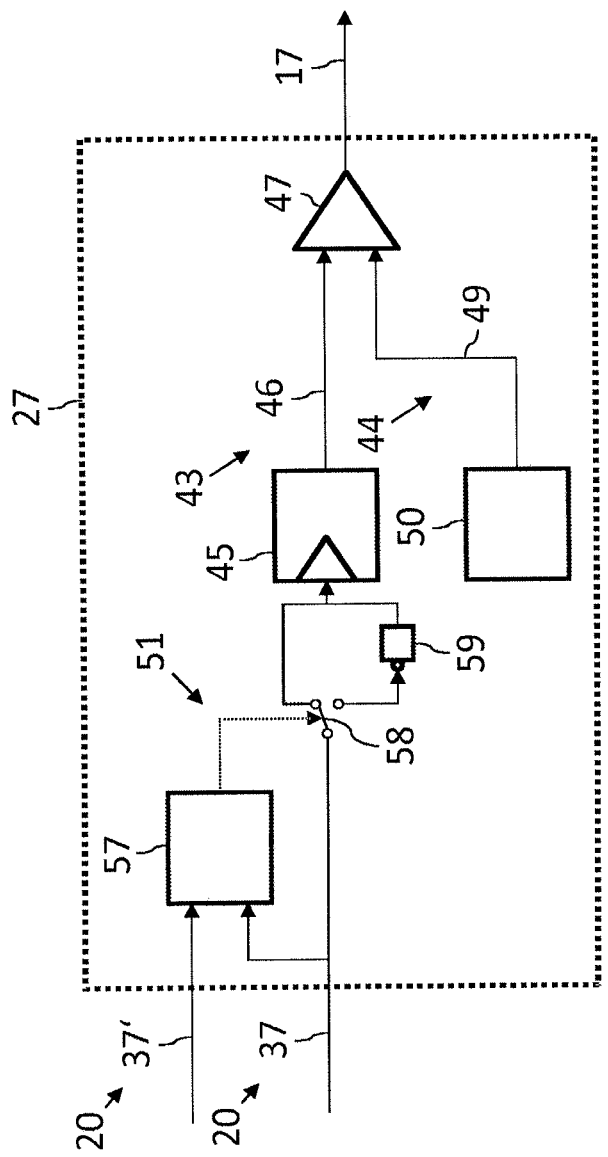

The decision can be made with a double pulse detection device 57 which is shown in FIG. 9 and which then actuates a switch 58 in order to conduct, if appropriate via a gating element 59, one of the pulse signals 37 whose pulses 40 are counted to form the travel counting value 46, so as to implement the abovementioned counting forward and counting backward. A corresponding technical capability of the counter 54 to count forward in the case of positive pulses 40 and to count backward in the case of negative pulses 40 is assumed here.

However, in the case of a shaking movement transversely with respect to the rolling direction of the vehicle 2, the pulses occur completely randomly at the wheels. In order to also separate as reliably as possible a rolling movement of the vehicle from a shaking movement in this situation, within the scope of the present embodiment it is proposed to carry out the abovementioned comparison of the pulse signals 37, 37' not on the basis of two wheel rotational speed sensors 19 of the vehicle 2 but rather at least on the basis of three, preferably four, wheel rotational speed sensors 19 of the vehicle 2.

Figure 10:
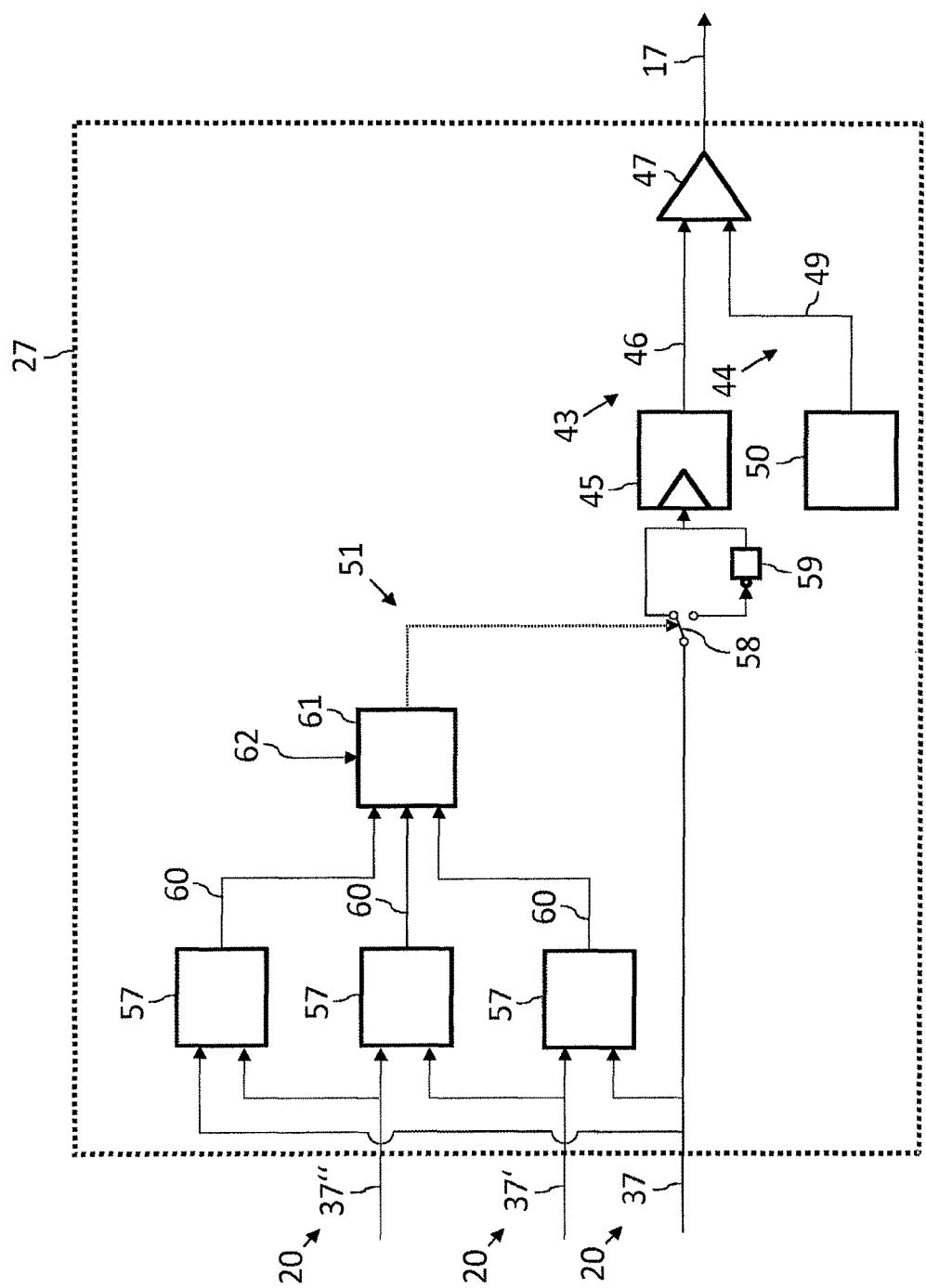

This is clarified with reference to FIG. 10 in which the pulse signals 37, 37' and 37" from three different wheel rotational speed sensors 19 are evaluated by way of example. The three different pulse signals 37, 37' and 37" permit three comparison possibilities. Four different pulse signals 37 would correspondingly allow six comparison possibilities. Each comparison possibility for the detection of a double pulse as explained in FIG. 8 is carried out with a separate double pulse detection device 57, wherein each double pulse detection device 57 indicates, with a detection signal 60, the presence of a double pulse. A counting device 61 counts the number of detected double pulses indicated by the individual detection signals 60, at regular time intervals, for example once per software cycle. The counting device 61 now actuates the switch 58 only if the number of detected double pulses exceeds a predetermined double pulse counting threshold 62.

The counting device 61 ultimately ensures that a randomly occurring double pulse is not evaluated as the reversal 51 of direction. Only if ultimately all the wheels 6 of the vehicle 2 exhibit the same behavior can the shaking movement of the vehicle 2 be reliably inferred from a double pulse which occurs.

Figure 11:
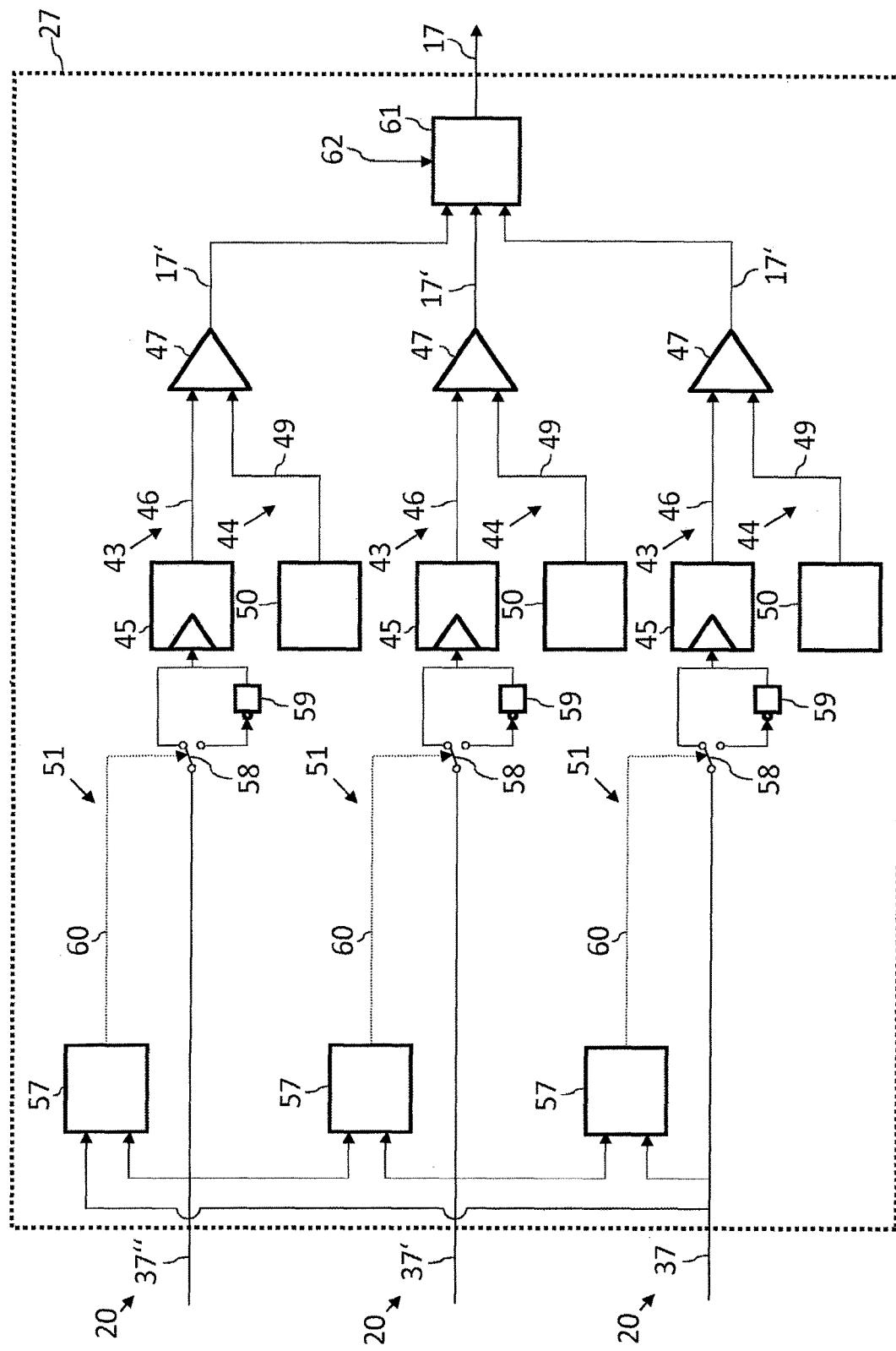

Alternatively, as shown in FIG. 11 it is also possible to detect a separate preliminary movement 17' of the vehicle 2 on the basis of each comparison, wherein the counting device 61 indicates the movement 17 of the vehicle 2 when the number of preliminary movements exceeds the double pulse counting threshold 62.

Figure 12:
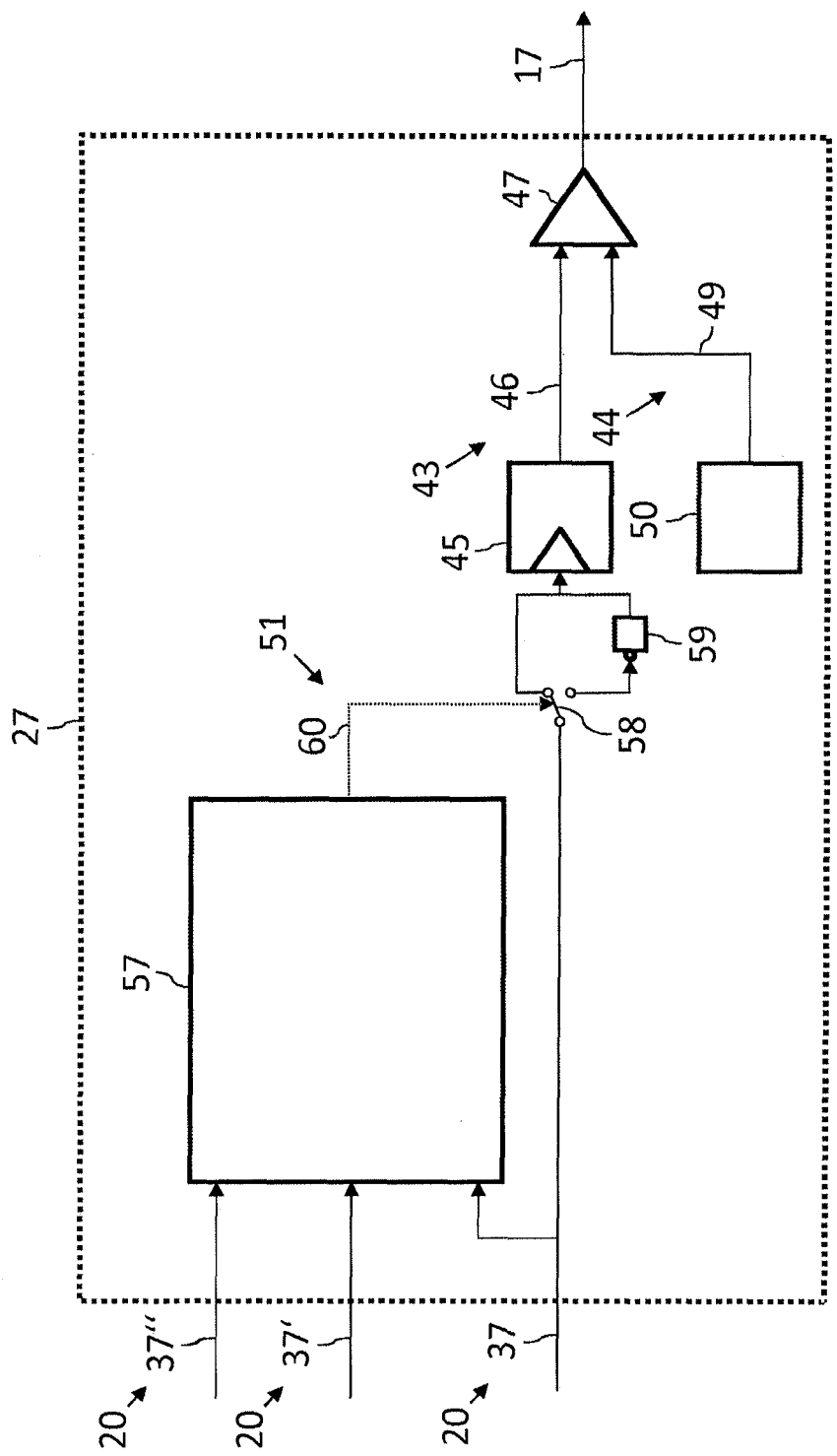

In an embodiment indicated in FIG. 12, a single double pulse detection device 57 can be provided which receives all the pulse signals 37, 37', 37" and outputs the detection signal 60 as soon as two successive pulses 40 are sensed in one of the pulse signals 37, 37', 37" without a pulse 40 being sensed between them on one of the other pulse signals 37, 37', 37". In this case, the detection signal 60 directly contains the information about the reversal 51 of direction.

In all the exemplary embodiments, the counters 54 can be reset if the travel counting value 46 of one of the counters 45 exceeds a resetting threshold which expediently should be higher than the travel counting boundary 49. This fact is no longer illustrated graphically in the figures for the sake of clarity.

Although the movement detection device 27 is used in the closed-loop control circuit 23 in FIG. 3, an alarm device, which, for example, warns the driver or other persons that the vehicle is moving and the parking brake 10 has to be pulled on more strongly, could alternatively be actuated on the basis of the detected movement.

In addition, the double pulse counting threshold 62 can be selected as a function of the gradient 5, in order, for example, to carry out the detection of the movement 17 more sensitively in the case of relatively large gradients.

The invention claimed is:

1. A method for detecting a movement of a vehicle which is shut down in a parked state, comprising:
   acquiring, by a first wheel rotational speed sensor, a first movement variable which describes the movement of the vehicle,
   acquiring, by a second wheel rotational speed sensor, a second movement variable which describes the movement of the vehicle,
   determining, by a processor, a direction of movement of the vehicle with respect to a movement travel by comparing the first movement variable to the second movement variable,
   integrating, by the processor, the first movement variable and the second movement variable as a function of the direction of movement of the vehicle, and
   deciding, by the processor, on the movement to be detected if the movement travel satisfies a predetermined condition.

2. The method as claimed in claim 1, wherein the vehicle comprises wheels, each having one wheel rotational speed sensor for outputting rotational speed pulses which are dependent on a rotational speed of the respective wheel, and wherein the movement variable is described by the rotational speed pulses.

3. The method as claimed in claim 2, wherein a comparison of the rotational speed pulses from the wheel rotational speed sensor of a first wheel of the wheels of the vehicle and the rotational speed pulses from the wheel rotational speed sensor of a second wheel of the wheels of the vehicle is used to determine the duration of movement.

4. The method as claimed in claim 3, wherein the comparison comprises comparing whether a rotational speed pulse from the wheel rotational speed sensor of the first wheel of the vehicle is directly followed chronologically by two rotational speed pulses from the wheel rotational speed sensor of the other wheel of the vehicle.

5. The method as claimed in claim 1, further comprising:
   acquiring a comparison movement variable which describes a comparison movement of the vehicle,
   integrating the measured comparison movement variable as a function of a comparison movement direction of the vehicle with respect to a comparison movement travel, and
   deciding on the movement to be detected if both the movement travel and the comparison movement travel satisfy the predetermined condition.

6. The method as claimed in claim 5, wherein the comparison movement variable is described by the rotational speed pulses, and the comparison movement direction is determined on the basis of a comparison of the rotational speed pulses from the wheel rotational speed sensors of at least two wheels of the vehicle, at least one wheel of which is a third wheel of the wheels of the vehicle.

7. The method as claimed in claim 5, wherein a number of comparison movements based on the decision on the movement to be detected and/or the predetermined condition are dependent on a gradient of an underlying surface on which the vehicle is standing.

8. The method as claimed in claim 1, further comprising:
   resetting the movement travel if the movement travel satisfies a further predetermined condition which is different from the predetermined condition.

9. A method for retensioning a parking brake which keeps a vehicle which has been shut down in a parked state in a stationary state comprising:
   acquiring, by a first wheel rotational speed sensor, a first movement variable which describes the movement of the vehicle, acquiring, by a second wheel rotational speed sensor, a second movement variable which describes the movement of the vehicle, determining, by a processor, a direction of movement of the vehicle with respect to a movement travel by comparing the first movement variable to the second movement variable, integrating, by the processor, the first movement variable and the second movement variable as a function of the direction of movement of the vehicle, deciding, by the processor, on the movement to be detected if the movement travel satisfies a predetermined condition, and retensioning of the parking brake on the basis of the detected movement.

10. A control device for carrying out a method for detecting a movement of a vehicle which is shut down in a parked state, comprising:

a first wheel rotational speed sensor configured to acquire a first movement variable which describes the movement of the vehicle, a second wheel rotational speed sensor configured to acquire a second movement variable which describes the movement of the vehicle, a processor configured to:
 determine a direction of movement of the vehicle with respect to a movement travel by comparing the first movement variable to the second movement variable,
 integrate the first movement variable and the second movement variable as a function of the direction of movement of the vehicle, and decide on the movement to be detected if the movement travel satisfies a predetermined condition.

11. The method as claimed in claim 6, wherein a number of comparison movements based on the decision on the movement to be detected and/or the predetermined condition are dependent on a gradient of an underlying surface on which the vehicle is standing.

* * * * *